Sept. 7, 1965    D. J. DOWNING    3,205,052
SOLDER FLUX FOR A CAN BODY
Filed Dec. 23, 1963
Fig. 1
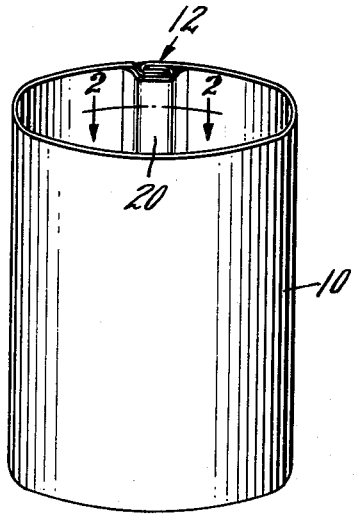
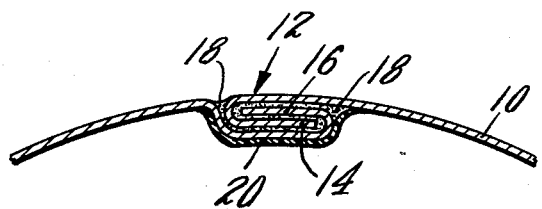
Fig. 2
INVENTOR
DENIS JOSEPH DOWNING
BY
Robert P. Auber
ATTORNEY

United States Patent Office 3,205,052
Patented Sept. 7, 1965

3,205,052
SOLDER FLUX FOR A CAN BODY
Denis Joseph Downing, Cary, Ill., assignor to American Can Company, New York, N.Y., a corporation of New Jersey
Filed Dec. 23, 1963, Ser. No. 332,363
6 Claims. (Cl. 29—195)

The present invention relates to a novel solder flux for a tubular sheet metal can body and particularly to a composition acomplishing the dual function of acting as a fluxing agent for the soft soldering of the side seam of a can body and, after soldering, providing an organic coating film over the soldered side seam.

The sheet metal can industry has consistently sought to improve the ability of the can to withstand corrosive attack by a product packed therein; and conversely to prevent the can from releasing undesirable contaminants into the product. It is known that one of the more troublesome areas subject to attack and to contaminant release is the side seam of the can body; and to a large extent this corrosion susceptibility and contaminant release property is due to the solder fluxes used in promoting the solderability of this side seam.

One means of alleviating this difficulty is to use milder solder fluxes which do not leave behind corrosive residues. However, this reduction in flux activity usually lessens the effectiveness of the flux. Another approach has been to deposit a film-forming resin over the side seam in the interior of the can subsequent to the soldering operation. This approach has not been entirely successful because corrosion forming underneath this side seam stripe due to corrosive flux residues adversely affects the adhesion of the stripe to the metal of the can body.

In copending application S.N. 256,925 filed February 7, 1963, solder fluxes for alleviating the above problems have been disclosed. The instant invention, although similar to that disclosed in the copending application, is an improvement thereover. It has been found that the subject solder flux, while retaining the desirable features thereof, has a stronger fluxing action than that described in the copending application thereby making it more suitable for use in soldering difficultly solderable metal sheets.

It is therefore an object of the instant invention to provide a novel solder flux which is efficient in its fluxing activity, leaves behind little or no corrosive residues and forms its own covering film over the interior surface of the side seam subsequent to soldering.

It is also an object to provide a solder flux composition of the character described having efficient solder fluxing action on difficultly solderable sheet metal.

A further object is to provide a sheet metal can body, the interior surface of the side seam of which is covered by an adherent organic coating which provides a barrier between the side seam and a product packed in a can made from this body; and which coating provides a base coating to which subsequent protective coatings may be adhered.

Numerous other objects and advantages of the invention will be apparent as it is better understood from the following description, which, taken in connection with the acompanying drawing, discloses a preferred embodiment thereof.

The above objects are accomplished by aplying to at least one of the two longitudinally extending can body hooks, prior to their inter-engagement and soldering to form a side seam, a fluxing composition comprising a combination of a solft solder fluxing agent and an organic film-forming material contained in a volatile solvent. Upon forming and soldering the side seam in the well-known manner, the heat of the soldering operation makes the active ingredient in the fluxing agent available to perform its function, removes any volatile solvent remaining in the composition and causes the film-forming material, which floats on the surface of the molten solder traveling through the side seam, to flow out and cover the interior surface of the side seam so that upon cooling of the side seam subsequent to soldering a solid film of an organic coating forms over the interior surface of the side seam.

Referring to the drawings:
FIG. 1 is a perspective view of a sheet metal can body; and
FIG. 2 is an enlarged fragmentary sectional view taken substantially along lines 2—2 of FIG. 1.

As a preferred or exemplary embodiment of the instant invention, FIG. 1 shows a tubular sheet metal, i.e. tin plate, can body 10 having a longitudinaly extending side seam generally designated 12. The can body 10 is made in a well-known manner such as by forming a flat blank into substantially tubular configuration, reversely bending the longitudinally extending margins thereof to form outer and inner reversely bent body hooks 14, 16 respectively (FIG. 2), applying a solder flux to at least one of these body hooks, preferably the outer hook 14, and thereafter inter-engaging the body hooks, bumping the thus engaged hooks to mechanically lock them together and flowing molten soft solder into the interstices between the locked body hooks whereby upon cooling, the solid solder 18 bonds and hermetically seals side seam 12. After the flux composition performs its fluxing function, the film-forming ingredient therein, which moves through the interstices of the seam ahead of the molten solder, flows out over the interior of the side seam and its immediately adjacent area. Upon cooling, the film-former solidifies and forms a coating 20.

The fluxing-film-forming composition of the instant invention comprises a rosin, an aliphatic fatty acid, morpholine hydrochloride as an active fluxing agent, which, upon heating releases hydrogen chloride capable of deoxidizing the surface to be soldered and a particular thermosettable acrylic resin as a film-former. The solvent for these ingredients is a volatile organic liquid containing at most a relatively small amount of water.

The rosin constituent for this composition may be rosin, hydrogenated rosin or partially polymerized rosin. The partially polymerized rosin, particularly that sold commercially under the name of Polypale Resin is preferred. This material is present in the composition in an amount of about from 5 to 25% and preferably 15 to 20% by weight. During soldering this rosin provides some of the fluxing action; and subsequent to soldering aids in forming a film over the soldered joint.

The fatty acids useful in the subject composition are monocarboxylic acids free of conjugated unsaturation and having 12 to 22 carbon atoms. Acids falling within this definition are myristic acid, palmitic acid, stearic acid, oleic acid, with oleic acid being preferred.

The exact function of the fatty acid in the solder fluxing compositions is not fully understood. Since it is not a drying oil acid it provides, by itself, no appreciable film-formation on the finished soldered side seam. While not wishing to be bound by any particular theory, it is possible that the carboxyl group of the acid aids the the composition in its fluxing activity at the elevated temperatures of the soldering opeartion. To provide its functions, the fatty acid may be present in the composition in widely varying amounts, i.e. from a fraction of a percent, e.g. about 0.1% by weight, to an appreciable percent, e.g. about 4% by weight. It is preferred, however, that the acid be present in an amount of about from 1 to 2%.

The morpholine hydorchloride fluxing agent has been found to have good fluxing activity and solubility in organic solvents. For reasons not fully understood it has been found that its fluxing activity is substantially greater than other standard amine hydrohalides conventionally used in solder fluxing compositions. In the subject composition the morpholine hydrochloride is used in an amount of about from 0.2 to 2.0 weight percent and preferably from .75 to 1.0 weight percent.

The particular acrylic resin used in the present invention is fully described in U.S. Patents 2,870,116 and 2,955,055. This acrylic resin is the reaction product of a cross-linking agent and an interpolymer of an acrylamide, preferably acrylamide itself, and at least one monomer having a vinylidene group, i.e. $CH_2=C<$. The interpolymerization is carried out in the presence of a siutable peroxide catalyst such as benzoyl peroxide. This interpolymer contains from 5 to 45%, and preferably 8 to 20% by weight of the acrylamide, the balance being the monomer or monomers containing the vinylidene group. Instead of the preferred acrylamide, methacrylamide may be substituted to form the interpolymer.

Preferred as the vinylidene group containing monomer or monomers for interpolymerization with the acryl amide are methyl acrylate, ethyl acrylate, butyl acrylate, styrene, vinyl toluene, acrylic acid and monomethyl styrene. Any one or a mixture of these monomers may be interpolymerized with the acrylamide.

The cross-linking agents for the acrylamide interpolymer found most effective are formaldehyde, N,N'-dimethoxymethyl-N,N'-ethyleneurea and N,N'-bis-methoxy-methyluron. It is ordinarily preferred to utilize two equivalents of cross-linking agents for each amide group present in the interpolymers. However, this amount can be raised or lowered if desired. For example, as high as three equivalents of cross-linking agents per amide group or as low as 0.2 equivalent per amide group may be used. This reaction between the interpolymer and cross-linking agent is carried out by heating in the presence of a mild catalyst such as maleic acid or maleic anhydride.

The reaction between the cross-linking agent and the acrylamide interpolymer is not carried out beyond the solvent soluble stage of the reaction product. Since the reaction product must be put into solution with the other non-volatile ingredients of the instant flux composition, such solvent solubility is essential. However, upon further heating, cross-linking continues until a thermoset or near-thermoset product results. The reaction product is present in the flux composition of the instant invention in an amount of from 0.75 to 3.0% and preferably from 1 to 2% by weight of non-volatile ingredients.

It has been found that water in a soft solder flux composition tends to vaporize explosively when subjected to the heat of the soldering operation. This extremely rapid vaporization of the water appears to cause splattering of the flux beyond the area the flux is intended to treat. Such a result is undesirable since it may lead to discolored spots on areas of the can body removed from the side seam and, in some cases, to small sites of corrosion. For this reason, the flux useful in the instant invention should contain as little water as possible.

To solubilize all of the ingredients in the composition, a mixture of compatible anhydrous solvents is used. Each of the essential ingredients in the composition, the rosin, the fatty acid, the amine hydrochloride and the acrylic resin are soluble, at least to a substantial degree, in lower alkyl ketones, lower alkanols, lower alkoxy alkanols or lower alkyl esters thereof; therefore, volatile liquids falling within these categories are preferred for use as the solvent system for the flux composition. Some aromatic hydrocarbon solvent such as benzene, toluene and xylene can be tolerated to bring down the cost of the solvent. By the term lower alkyl used herein is meant an alkyl group containing 1 to 4 carbon atoms. The preferred lower alkanol is isopropanol; whereas the preferred lower alkoxy-lower alkanol is 2-ethoxy-ethanol and the preferred ester thereof is 2-ethoxy-ethylacetate.

If a mixture of lower alkanol with an ether-alcohol or ether-alcohol ester constitutes the solvent system, the weight ratio of ether-alcohol or ester thereof to alkanol in the fluxing composition is about from 2:1 to 1:4 and preferably about 1:2. These volatile organic solvents are preesnt in the fluxing composition in an amount of about 65 to 85 weight percent, and preferably about 75% by weight.

As indicated previously, the instant composition is applied to at least one of the body hooks as a liquid prior to bumping and soldering of the side seam. After bumping but before soldering, the mechanically locked side beam is preheated by any suitable means such as passing the side seam over a plurality of gas burners. During this preheating step substantially all of the volatile solvents are removed leaving a mobile residue of unreacted fluxing agent and film-forming material. After leaving the preheaters the side seam passes through the soldering operation which, in standard commercial practice, is a series of metal solder rolls rotating in a bath of molten solder. When the seam contacts the hot molten solder carried on the rolls, the fluxing agent decomposes and produces volatile hydrogen chlorine fluxing gas. The fluxing gas in combination with other ingredients in the composition, cleans the surface of the metal so that the solder will wet this surface and thereafter escapes into the atmosphere or preferably into a collecting hood. During and after passing over the solder roll the heat therefrom plus the surrounding air causes the film-formers in the composition to cure into the solid coating 20.

The following example is by way of explanation and is not to be construed as a limitation of the subject invention:

| Ingredient: | Parts by weight |
| --- | --- |
| Polypale Resin | 16.38 |
| 2-ethoxy-ethanol | 26.82 |
| Isopropanol (IPA) | 40.35 |
| Oleic acid (25% in IPA) | 6.54 |
| Hydrochloric acid (conc.) (25% in IPA) | 4.28 |
| Morpholine | 2.49 |
| Acrylic resin (40% in a 3 to 1 toluene-butanol mixture) | 3.14 |
| Silicone resin | Trace. |

To combine the above ingredients, the 2-ethoxy-ethanol and isopropanol are mixed and the Polypale Resin dissolved therein. To this solution is added the oleic acid solution and the HCl solution with mixing. The morpholine is then mixed in. It will be noted that the morpholine and HCl are present in the composition in a 1 to 1 mol ratio. The acrylic resin solution is then added with mixing followed by the silicone resin. The silicone resin is an optional ingredient which improves the flow-out of the composition after its application to the can body; and it may be present in the composition in amounts of from 0 to 200 parts per million parts of total flux composition.

The above compositions were used as fluxes in soft soldering tin plate can body side seams in the manner hereinbefore described. Cans with the side seam formed using the instant fluxes when compared to cans using standard commercial beer can fluxes showed a reduction of several hundred percent in iron pick-up of the product packed in these cans and an appreciable increase in side seam blow-up strength. Further, compared to the fluxes described in the aforementioned copending application the instant fluxes showed an appreciable improvement in solder distribution in at least the first fold if not the entire side seam.

It is thought that the invention and many of its attendant advantages will be understood from the foregoing description and it will be apparent that various changes may be made in the matter of the ingredients, the identity and the proportions of the formulation, and that changes may be made in the form, construction and arrangement of the parts of the article without departing from the spirit and scope of the invention or sacrificing all of its material advantages, the form hereinbefore described being merely a preferred embodiment thereof.

I claim:

1. An essentially anhydrous film-forming and soft solder fluxing composition comprising:

a rosin;

a fatty acid free of conjugated unsaturation and having 12 to 22 carbon atoms;

morpholine hydrochloride;

the reaction product of (a) a compound selected from the group consisting of HCHO, N,N'-dimethoxymethyl - N,N' - ethyleneurea and N,N'-bismethoxymethyluron, and (b) an interpolymer of an acrylamide and at least one monomer having a vinylidene group; and a volatile organic solvent for said rosin, said acid, said hydrochloride and said reaction product.

2. The composition set forth in claim 1 wherein said rosin is partially hydrogenated rosin.

3. The composition set forth in claim 1 wherein said acid is oleic acid.

4. The composition set forth in claim 1 containing by weight about from 5 to 25% of said rosin, about from 0.1 to 4.0% of said acid, about from 0.2 to 2.0% of said morpholine hydrochloride, about from 0.75 to 3.0% of said reaction product and about from 65 to 85% of said solvent.

5. The composition set forth in claim 1 wherein said solvent is a mixture of lower alkanol and a lower alkoxylower alkanol.

6. In a tubular sheet metal can body having a longitudinally extending side seam comprising a plurality of layers of metal bonded together with a soft solder, the improvement comprising:

a solid protective film on the interior surface of said side seam, said film being the thermal reaction product of the composition of claim 1.

References Cited by the Examiner

UNITED STATES PATENTS

| 1,949,916 | 3/34 | McQuaid | 148—23 |
| 2,901,387 | 8/59 | Forker et al. | 148—23 |
| 3,117,693 | 1/64 | Vogel | 117—97 |

DAVID L. RECK, *Primary Examiner.*

WINSTON A. DOUGLAS, *Examiner.*